(12) United States Patent
Perrin et al.

(10) Patent No.: US 7,360,642 B2
(45) Date of Patent: Apr. 22, 2008

(54) SPIRAL-LINK BELT WITH DRIVE BARS

(75) Inventors: Dominique Perrin, St Junien (FR); Jean-Louis Monnerie, Saint-Junien (FR)

(73) Assignee: Albany International Corp., Albany, NY (US)

(*) Notice: Subject to any disclaimer, the term of this patent is extended or adjusted under 35 U.S.C. 154(b) by 0 days.

(21) Appl. No.: 11/394,010

(22) Filed: Mar. 30, 2006

(65) Prior Publication Data

US 2007/0235290 A1 Oct. 11, 2007

(51) Int. Cl.
*B65G 15/54* (2006.01)
(52) U.S. Cl. .................... 198/848; 198/834
(58) Field of Classification Search ............. 198/848, 198/834, 835, 778
See application file for complete search history.

(56) References Cited

U.S. PATENT DOCUMENTS

| 520,906 | A | | 6/1894 | Tourasse | |
|---|---|---|---|---|---|
| 2,025,620 | A | * | 12/1935 | Sneesby | 198/848 |
| 2,628,706 | A | * | 2/1953 | Guba | 198/834 |
| 2,880,848 | A | * | 4/1959 | Lundy et al. | 198/834 |
| 4,345,730 | A | | 8/1982 | Leuvelink | |
| 4,567,077 | A | | 1/1986 | Gauthier | |
| 4,575,472 | A | | 3/1986 | Lefferts | |
| 4,695,015 | A | | 9/1987 | Salminen | |
| 4,839,213 | A | | 6/1989 | Gauthier | |
| 5,334,440 | A | | 8/1994 | Halterbeck et al. | |
| 5,534,333 | A | | 7/1996 | Keller et al. | |
| 5,558,208 | A | * | 9/1996 | Kucharski | 198/848 |
| 5,829,578 | A | * | 11/1998 | Froderberg | 198/848 |
| 5,915,422 | A | | 6/1999 | Fagerholm | |
| 6,041,916 | A | * | 3/2000 | Daringer et al. | 198/834 |
| 6,158,577 | A | * | 12/2000 | Tjabringa | 198/848 |
| 2006/0005936 | A1 | | 1/2006 | Breuer et al. | |
| 2006/0124268 | A1 | | 6/2006 | Billings | |

FOREIGN PATENT DOCUMENTS

| DE | 4218884 C2 | | 6/1992 | |
| DE | 4218884 | * | 12/1993 | 198/848 |

* cited by examiner

*Primary Examiner*—James R. Bidwell
(74) *Attorney, Agent, or Firm*—Frommer Lawrence & Haug LLP; Ronald R. Santucci

(57) ABSTRACT

A spiral-link belt for use as, for example, a conveyor belt comprising a belt body formed of a series of cross-machine direction (CD) spiral coils linked by pintles in the CD to form an endless loop and a plurality of CD drive bars. Each CD drive bar is formed of linked spiral coils integrated into the belt body.

12 Claims, 7 Drawing Sheets

SPIRAL-LINK BELT WITH DRIVE BARS

BACKGROUND OF THE INVENTION

1. Field of the Invention

The present invention relates to spiral-link fabrics. More specifically, the present invention relates to spiral-link fabrics having drive bars for use as conveyor belts and on other industrial machines requiring fabrics/belts.

2. Description of the Related Art

A conveyor is a mechanical system which allows for fast and efficient transport of small or bulky materials over a short defined area. There are a variety of industrial applications which require the use of conveyors. For example, in the food processing industry conveyors are used to move food items through various processing steps (e.g. from final preparation to packaging). Other uses include transporting boxed or packaged goods into or out of a warehouse. For example, transporting goods from the shelves on which they are stored to loading docks where trucks are waiting to be loaded.

A common type of conveyor comprises a conveyor belt (or fabric) in the form of an endless loop around two or more rollers (or drums). In this case, the outward surface of the conveyor belt is in contact with the goods while the inner or machine-side of the belt contacts the rollers. Conveyor belts can be formed in almost any manner including weaving machine direction ("MD") and cross machine direction ("CD") yarns, impregnating woven or nonwoven substrates with resin, and linking plastic or metal spiral coils.

A conveyor belt may be formed completely of spiral coils (so called "spiral-link belt") as taught by Gauthier, U.S. Pat. No. 4,567,077; which is incorporated herein by reference. In such a belt, spiral coils are connected to each other by at least one connecting pin, pintle or the like. FIG. 1 is a diagram of a prior art spiral-link belt showing the interconnections between a right-turn spiral coil 101 and a left-turn spiral coil 102. A pintle 103 is inserted between the interdigitated loops of the right and left turn spiral coils. For clarity, the foreground portions of the coils are shown as solid lines while the background portions of the loops are shown as dashed lines. Alternating spiral coils can be repeatedly linked in this manner to form a belt of almost any dimension. In theory, a seam can be placed at any location in the belt body where a connecting pin may be removed. Spiral-link belts offer a number of advantages over traditional belts. For example, the seam of a spiral-link belt is geometrically similar to the rest of the belt body. A spiral-link belt may also be coated or impregnated with a resin or polymeric material.

Conveyors may be inclined to transport goods from one height to another. As a result, unless some type of arresting means is used the goods could shift, slide, or roll on the conveyor. A variety of arresting means have been devised to overcome this problem. For example, some conveyors use belts coated with a rubber or polymeric resin material which has a high coefficient of friction and prevents goods from slipping.

Another means for preventing slippage is to attach drive bars to the conveyor belt in the cross-machine direction. The attachment of these drive bars (typically, by bonding or sewing) is often a difficult and time consuming process. Moreover, since the attached drive bars often have different characteristics than the belt and are not well integrated, the attachment means may cause localized stresses which lead to failure of the drive bar or the entire belt. As will be readily appreciated, replacing drive bars can lead to delays in using the conveyor, and also represents a significant cost to the user. Accordingly, there is a need for a conveyor belt having well integrated drive bars.

SUMMARY OF THE INVENTION

Accordingly, the present invention relates to a spiral-link belt having integrated drive bars for use as a conveyor belt or in other industrial machine applications.

The present invention is a spiral-link belt comprised of a belt body formed of a series of cross-machine direction (CD) spiral coils linked by pintles in the cross-machine direction (CD) to form an endless belt loop and a plurality of CD drive bars. Each CD drive bar is formed of linked spiral coils integrated into the belt body. In a preferred embodiment, each CD drive bar is formed of a first spiral coil attached to a second spiral coil in the belt body and a third spiral coil attached to a fourth spiral coil in the belt body; with the first and third spiral coils being linked together out of the plane of the belt body.

In another embodiment, the first and third spiral coils are linked respectively to a fifth spiral coil and a sixth spiral coil which are linked together out of the plane of the belt body.

In still another embodiment, the first and third spiral coils are linked respectively to a fifth spiral coil out of the plane of the belt body.

Other aspects of the invention include the first spiral coil being attached to the second spiral coil using a pintle and the third spiral coil being attached to the fourth spiral coil using a pintle. The first spiral coil is preferably linked to the third spiral coil using a pintle. At least one of the plurality of CD drive bars may include at least one insert for support. Inserts may be located within at least one of the spiral coils comprising the drive bar or, an insert may located between the spiral coils comprising the drive bar and the body of the spiral-link belt. Preferably, the plurality of CD drive bars will be equally spaced in the MD of the belt. The belt body and each CD drive bar may be formed of an alternating series of linked left-turn and right-turn spiral coils. The spiral-link belt may be a conveyor belt. The plurality of CD drive bars may also, or alternatively, be located on the machine side of the belt, thereby forming cogs to engage appropriately spaced grooves on drive rollers, thereby preventing slippage of the spiral-link belt.

The present invention will now be described in more complete detail with reference being made to the figures wherein like reference numerals denote like elements and parts, which are identified below.

BRIEF DESCRIPTION OF THE DRAWINGS

For a more complete understanding of the invention, reference is made to the following description and accompanying drawings, in which.

DETAILED DESCRIPTION OF THE PREFERRED EMBODIMENTS

A preferred embodiment of the present invention will be described in the context of a spiral-link belt for use as a conveyor belt, as well as in other industrial settings.

Figure 1:
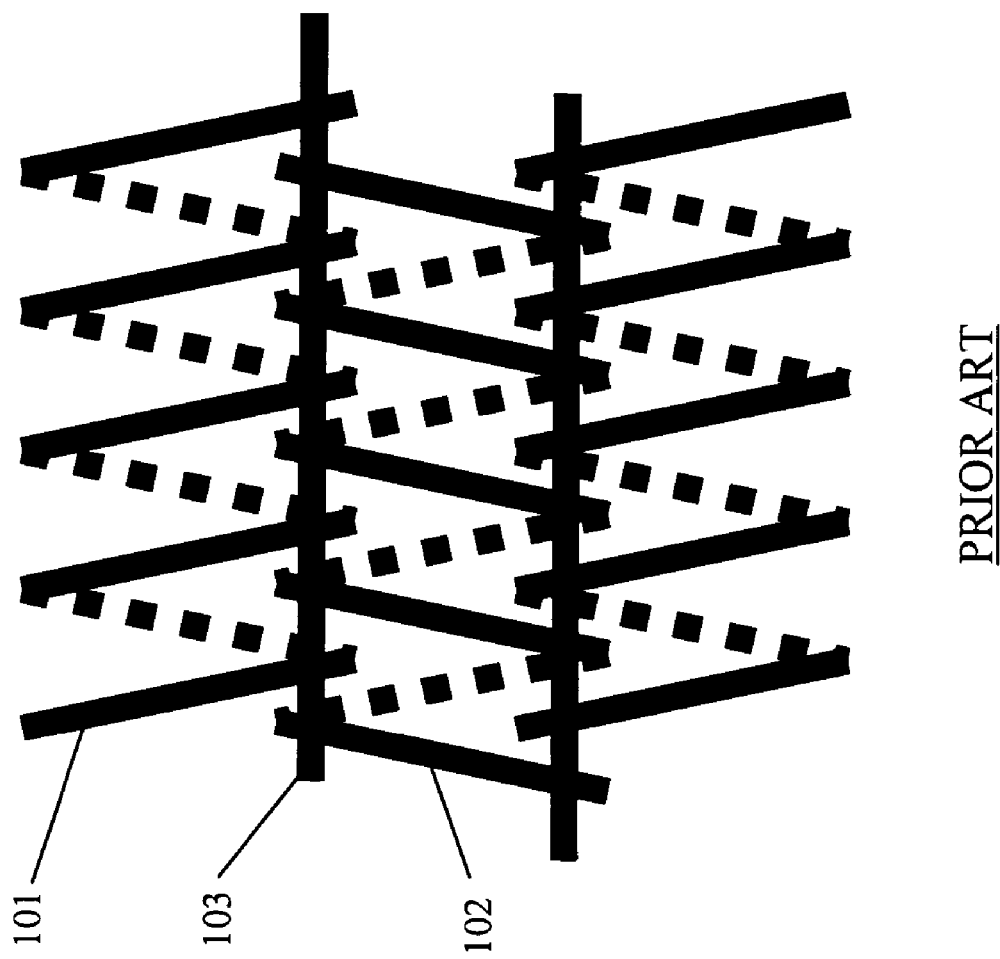
FIG. 1 is a diagram of a prior art spiral-link belt showing the interconnections between right-turn spiral coils and left-turn spiral coils.
Figure 2:
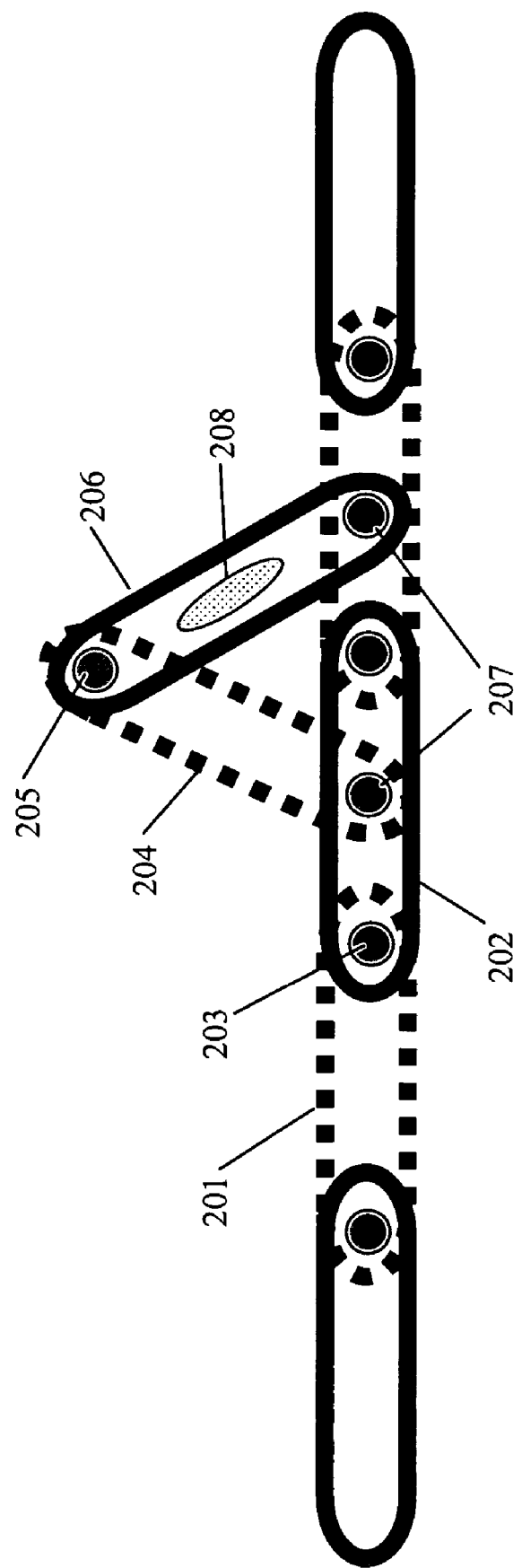
FIG. 2 is a side view illustration of an exemplary spiral-link belt having a drive bar formed by two attached spiral coils in accordance with the teachings of the present invention.

FIG. 2 is a side view illustration of an exemplary spiral-link belt having a drive bar formed by two attached spiral coils in accordance with the teachings of the present invention. The body of the belt is formed by linking alternating left-turn and right-turn spiral coils 201, 202 by interdigitating their loops and inserting a pintle 203 in the manner shown in FIG. 1. The drive bar is formed by attaching a left-turn spiral coil 204 to a right-turn spiral coil in the body and a right-turn spiral coil 206 to an adjacent left-turn spiral coil in the body using pintles 207. The other ends of the attached left-turn and right-turn spiral coils 204, 206 are then linked to each other using another pintle 205. As shown in FIG. 2, the resulting drive bar protrudes above the plane of the belt's body, yet is securely integrated into the body. Typically, a series of drive bars will be formed at evenly spaced MD intervals along the belt. To stiffen/support the drive bars an insert 208 may be placed in one or both of the drive bar's spiral coils.

Figure 4:
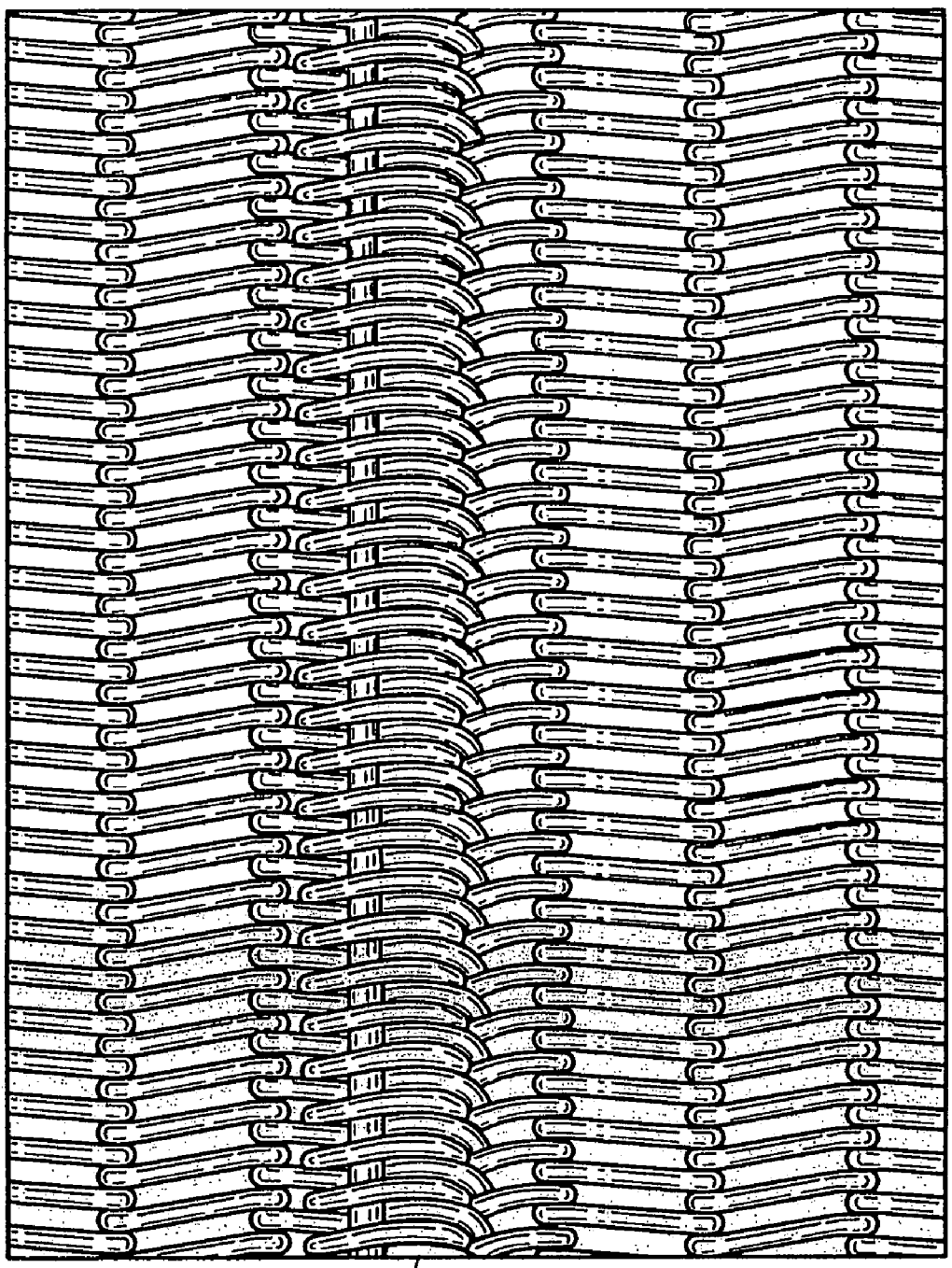
FIG. 4 is a picture showing the surface of an exemplary spiral-link belt having a drive bar in accordance with the teachings of the present invention.
Figure 5:
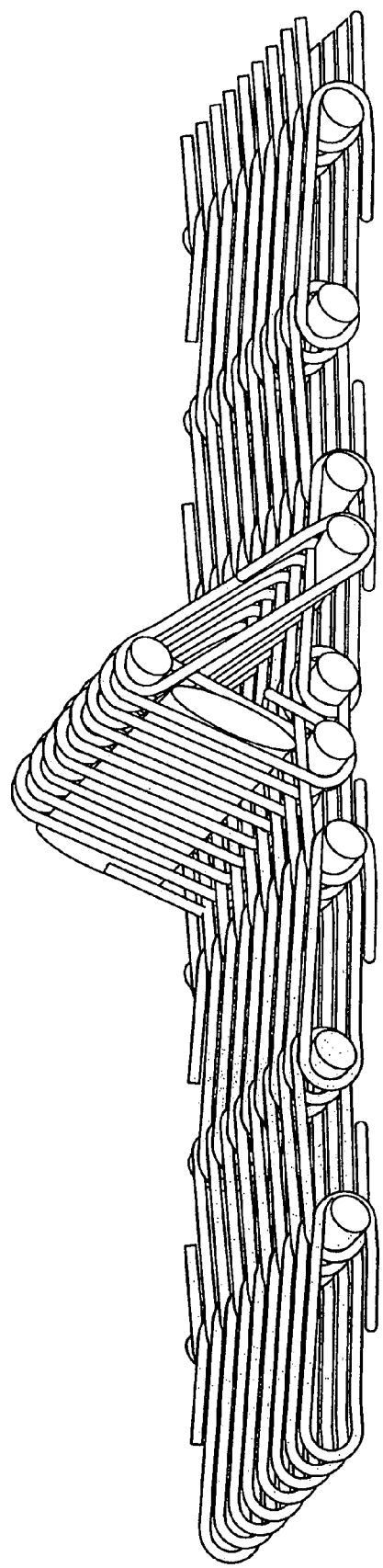
FIG. 5 is a side view picture of an exemplary spiral-link belt having a drive bar formed by two attached spiral coils in accordance with the teachings of the present invention.

FIGS. 4 and 5 are pictures showing respectively a surface view and a side view of an exemplary spiral-link belt having a drive bar 402 as shown in FIG. 2.

Figure 3:
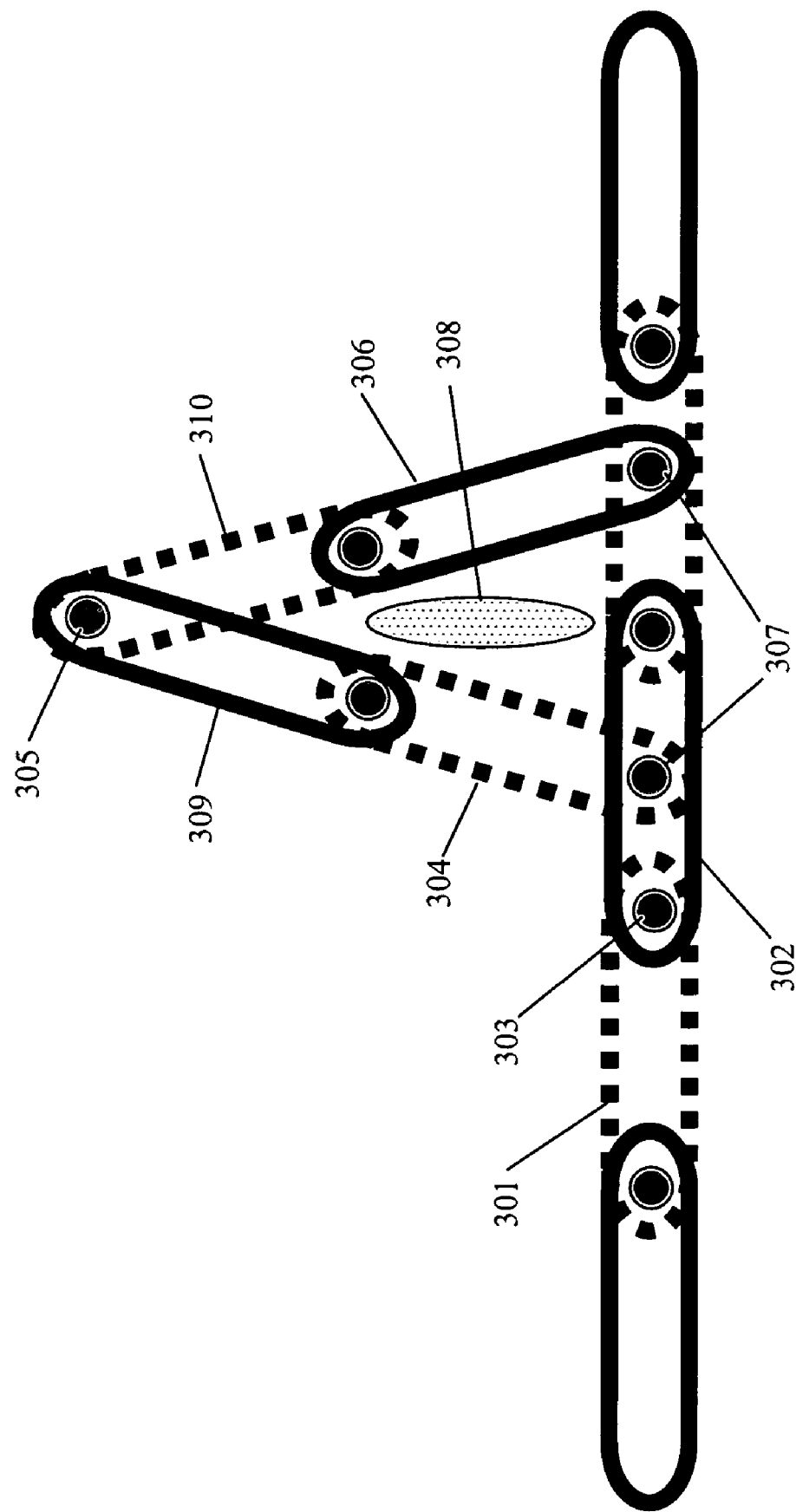
FIG. 3 is a side view illustration of another exemplary spiral-link belt having a drive bar formed by four attached spiral coils in accordance with the teachings of the present invention.

FIG. 3 is a side view illustration of another exemplary spiral-link belt having a drive bar formed by four attached spiral coils in accordance with the teachings of the present invention. The body of the belt is formed by linking alternating left-turn and right-turn spiral coils 301, 302 by interdigitating their loops and inserting a pintle 303 in the manner shown in FIG. 1. The drive bar is formed by attaching a left-turn spiral coil 304 to a right-turn spiral coil in the body and a right-turn spiral coil 306 to an adjacent left-turn spiral coil in the body using pintles 307. The other ends of the attached left-turn and right-turn spiral coils 304, 306 are then linked respectively to right-turn and left-turn spiral coils 309, 310, which in turn are linked to each other using another pintle 305. As shown in FIG. 3, the resulting drive bar protrudes above the plane of the belt's body, yet is securely integrated into the body of the belt. Typically, a series of drive bars will be formed at evenly spaced MD intervals along the belt. To stiffen/support the drive bars an insert 308 may be placed between the spiral coils comprising the drive bar and the body of the spiral-link belt. Inserts may alternatively, or additionally, be placed inside one or more of the drive bar's spiral coils, as in FIG. 2 depending upon the application.

Figure 6:
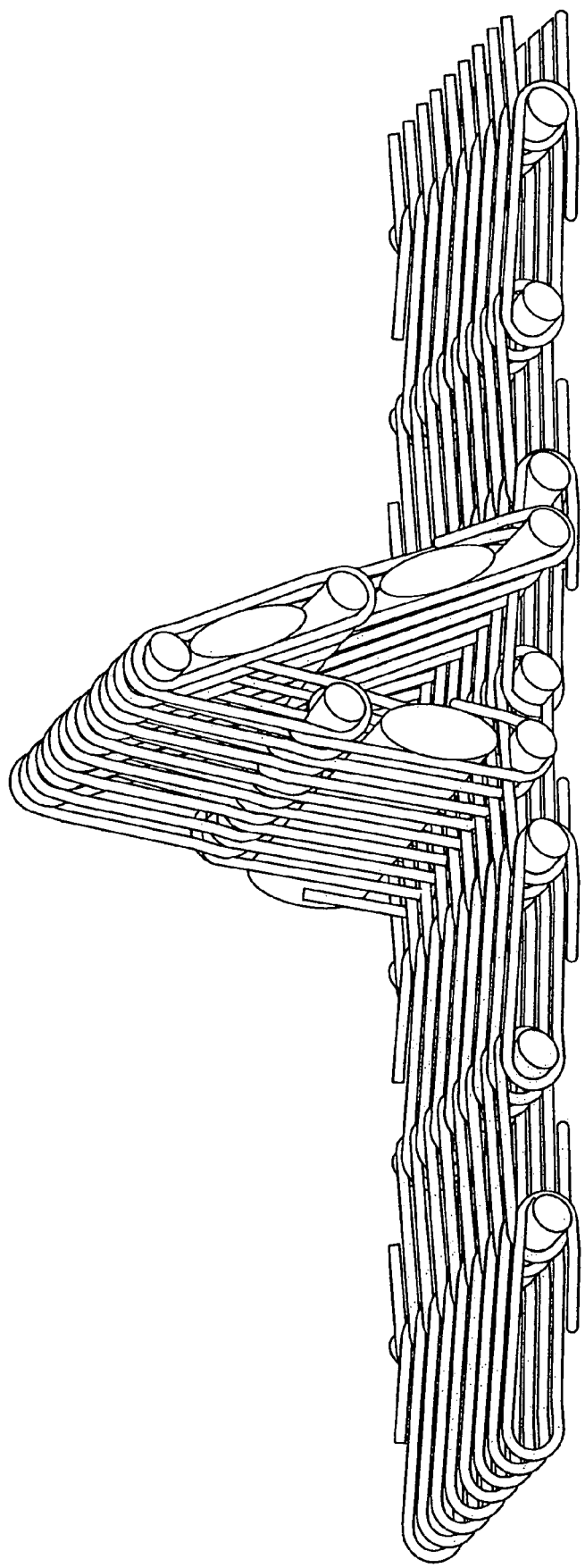
FIG. 6 is a side view picture of another exemplary spiral-link belt having a drive bar formed by four attached spiral coils in accordance with the teachings of the present invention.

FIG. 6 is a side view picture of an exemplary spiral-link belt having a drive bar as shown in FIG. 3.

Figure 7A:
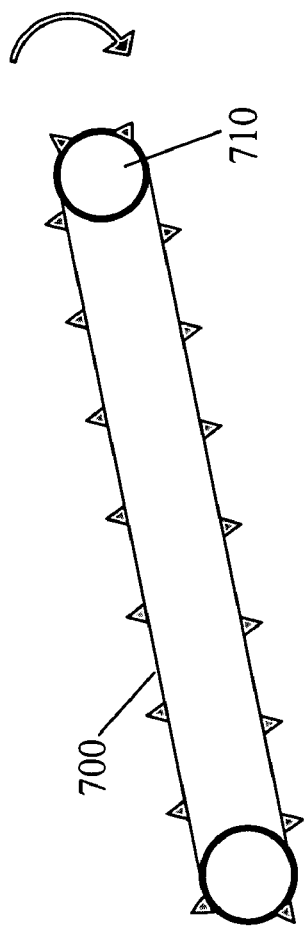
FIG. 7A is an illustration showing a present spiral-link belt being used as a conveyor belt.

FIG. 7A is an illustration showing a present spiral-link belt 700 being used as a conveyor belt. As shown, the spiral-link belt forms an endless loop around two rollers 710. The drive bars prevent goods from shifting as they are transported up the inclined conveyor.

Figure 7B:
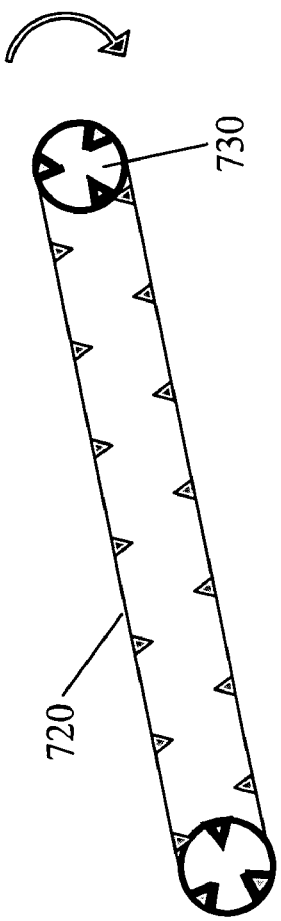
FIG. 7B is an illustration showing a present spiral-link belt being used as a "cogged" belt.

In another embodiment of the present invention, the drive bars may also, or alternatively, be formed on the machine side of the conveyor. FIG. 7B is an illustration showing a present spiral-link belt 720 being used as a "cogged" belt. As shown, the drive bars are along the inside of the belt and mesh with precisely spaced cutouts/grooves in the rollers 730. Here, the drive bars are essentially acting as cogs which prevent the belt from slipping and may even be used to drive the belt.

The spiral coils may be formed of a polymer (such as polyester), metal or other material suitable for this purpose and known to those skilled in the art. As is appreciated, the spiral coils may be formed in other shapes, for example, rectangular, oval, or may be flattened. Further, the spiral coils may be formed from a monofilament or multifilament material. Wider spiral coils may also be used, as taught in incorporated U.S. Patent Application entitled "Improved Spiral Fabric," Ser. No. 11/012,512, filed Dec. 15, 2004. Note, these examples are simply representative examples of the invention and are not meant to limit the invention. As with any spiral-link belt, some applications may require modifying certain fabric characteristics, such as controlling the air permeability. This can be accomplished, for example, by varying the size of the spiral links; by coating and/or impregnating with polymeric resins; and/or by using any number of types of stuffer yarns or inserts. The bars could also be manufactured separately from the belt and coated/impregnated if desired (except for the coil portion that is to be attached to the belt). The spiral coils that comprise the bar can be the same size, shape, and/or material as the belt body; or can be different in any one of these features. An advantage of the present invention, is that a damaged bar can be readily replaced in comparison with other types of bars.

The inserts (208, 308) are pieces/strips of material which may be inserted between the spiral coils of the drive bars and/or inside one or more of the spiral coils of the drive bars. Such inserts may be used to support/stiffen a drive bar (i.e. to maintain the profile of the drive bar). Inserts may also be used to modify a drive bar's characteristics (e.g. permeability). Inserts may be formed of a polymer (such as polyester), metal or other material suitable for this purpose and known to those skilled in the art. The inserts may be porous, solid, or have any desired permeability. The shape of the inserts preferably conforms to the geometric shape of the space within or between the spiral coils. Since the bars are typically not in use under tension, the inserts should be held in place to prevent their movement. Because of the bars' design, the inserts can only move or be removed in the CD. The inserts may be fastened in place by gluing, heat treatment, doping/impregnation of the belt edges, or by any other means known in the art.

Another aspect of the present invention involves spacing the loops of the spiral coils. The coil loops may be spaced on the pintle by mechanically spreading or tentering the loops during finishing (i.e. heat setting), inserting spacers on the pintle between the loops, and/or varying the diameter of the pintle. For example, the shape of the coils may be modified to include a "leg" or spacing section, similar to that taught in Fagerholm, U.S. Pat. No. 5,915,422; which is incorporated herein by reference. Several additional techniques are disclosed in commonly assigned U.S. patent application Ser. No. 11/012,512, aforementioned and U.S.

Patent Application entitled "Pintle For Spiral Fabric", Ser. No. 11/009,157, filed Dec. 10, 2004; which are incorporated herein by reference.

While the use of this fabric has been described for use as a conveyor belt, other industrial belt uses exist; such as belts/fabrics for use in the production of certain nonwoven products by processes such as, but not limited to, hydroentangling (spunlace), melt blown, or air laying.

For example, the present invention may be used as a forming belt for use in the production of nonwovens. A detailed description of the formation of nonwovens and specifically the manufacture of slitted or individual nonwoven sheets can be found in the commonly assigned U.S. patent application Ser. No. 11/285,454 entitled "Sheet Slitting Forming Belt For Nonwoven Products" filed Nov. 22, 2005, which is incorporated herein by reference.

Typically, a nonwoven web is formed on a forming fabric and requires additional processing to cut or slit the nonwoven web into smaller, individual sheets. Through use of the drive bars described above post processing cutting of the formed nonwoven web may be eliminated at least in the CD direction since use of the drive bars results in separate, individual nonwoven sheets being formed directly on the fabric during the web forming stage of the manufacturing process.

The drive bars may however be used to create all or part of a grid by adding additional bars or other structures in the MD direction. The grid should be made impermeable to air such as through the use of impermeable inserts, coating thereon or by other means suitable for the purpose. By having areas on the forming belt that are impermeable to air, fibers that are deposited on the fabric during the nonwoven manufacturing processes, are drawn by negative airflow or suction created by vacuum boxes located on the non-web forming side of the fabric, to the areas of the fabric that are permeable to air. As a result, the fibers that are deposited on the fabric accumulate on the air permeable areas of the fabric and not on the areas of the fabric that are impermeable. Because the fibers on either side of the air impermeable areas of the fabric are isolated from one another, these portions of the nonwoven web are prevented from becoming entangled with one another. The result is a nonwoven web that is already separated or slit into individual nonwoven pieces during the manufacturing process.

Modifications to the above would be obvious to those of ordinary skill in the art, but would not bring the invention so modified beyond the scope of the present invention. The claims to follow should be construed to cover such situations.

What is claimed is:

1. A spiral-link belt, comprising:
a belt body formed of a series of continuous cross-machine direction (CD) spiral coils linked by pintles in the CD to form an endless loop; and
a plurality of CD drive bars integrated into said belt body; wherein each CD drive bar is formed of a first spiral coil and a third spiral coil, one end of said first spiral coil attached to only a second spiral coil in the belt body and one end of third spiral coil attached to only a fourth spiral coil in the belt body; the other end of said first and third spiral coils being linked together out of the plane of the belt body.

2. The spiral-link belt according to claim 1, wherein the first spiral coil is attached to the second spiral coil using a pintle and the third spiral coil is attached to the fourth spiral coil using a pintle.

3. The spiral-link belt according to claim 1, wherein the first spiral coil is linked to the third spiral coil using a pintle.

4. The spiral-link belt according to claim 1, wherein at least one of said plurality of CD drive bars includes at least one insert.

5. The spiral-link belt according to claim 4, wherein said at least one insert is located within at least one of the spiral coils comprising the drive bar.

6. The spiral-link belt according to claim 4, wherein said at least one insert is located in the space formed by the spiral coils comprising the drive bar and the body of the spiral-link belt.

7. The spiral-link belt according to claim 1, wherein said plurality of CD drive bars are equally spaced in a machine direction of the belt.

8. The spiral-link belt according to claim 1, wherein the belt body and each CD drive bar are formed of an alternating series of linked left-turn and fight-turn spiral coils.

9. The spiral-link belt according to claim 1, wherein the spiral-link belt is a conveyor belt or a belt for forming nonwoven products.

10. The spiral-link belt according to claim 1, wherein said plurality of CD drive bars are located on a machine side of the belt, thereby forming cogs to prevent slippage of the spiral-link belt.

11. A spiral-link belt, comprising:
a belt body formed of a series of continuous cross-machine direction (CD) spiral coils linked by pintles in the CD to form an endless loop; and
a plurality of CD drive bars integrated into said belt body;
wherein each CD drive bar is formed of
a first spiral coil, one end of said first spiral coil attached to a second spiral coil in the belt body and
a third spiral coil, one end of said third spiral coil attached to a fourth spiral coil in the belt body; wherein the other end of said first and third spiral coils are linked respectively to one end of a fifth spiral coil and a sixth spiral coil, and the other end of said fifth and sixth spiral coils are linked together out of the plane of the belt body.

12. A spiral-link belt, comprising:
a belt body formed of a series of continuous cross-machine direction (CD) spiral coils linked by pintles in the CD to form an endless loop; and
a plurality of CD drive bars integrated into said belt body;
wherein each CD drive bar is formed of
a first spiral coil, one end of said first spiral coil attached to a second spiral coil in the belt body and
a third spiral coil, one end of said third spiral coil attached to a fourth spiral coil in the belt body; wherein the other end of said first and third spiral coils are linked respectively to a fifth spiral coil out of the plane of the belt body.

* * * * *